(12) United States Patent
Poasevara

(10) Patent No.: US 7,701,340 B2
(45) Date of Patent: Apr. 20, 2010

(54) METHOD AND DEVICE FOR THE DETECTION AND IDENTIFICATION OF OBJECTS, SECURE CONTAINERS AND SYSTEMS WHICH ARE PROVIDED WITH SAID DEVICE, AND OBJECTS ADAPTED FOR SAME

(75) Inventor: Claude Poasevara, Marcoussis (FR)

(73) Assignee: ALCEA, Marcoussis (FR)

( * ) Notice: Subject to any disclaimer, the term of this patent is extended or adjusted under 35 U.S.C. 154(b) by 773 days.

(21) Appl. No.: 10/553,472

(22) PCT Filed: Apr. 15, 2004

(86) PCT No.: PCT/FR2004/000926

§ 371 (c)(1),
(2), (4) Date: Oct. 17, 2005

(87) PCT Pub. No.: WO2004/095353

PCT Pub. Date: Nov. 4, 2004

(65) Prior Publication Data

US 2007/0008073 A1    Jan. 11, 2007

(30) Foreign Application Priority Data

Apr. 17, 2003    (FR) .................................. 03 04842

(51) Int. Cl.
*G08B 13/14* (2006.01)
*G08B 1/08* (2006.01)
*H01L 35/00* (2006.01)

(52) U.S. Cl. .............. 340/572.1; 340/572.7; 340/568.1; 340/539.22; 343/700 R

(58) Field of Classification Search .............. 340/572.1, 340/10.52

See application file for complete search history.

(56) References Cited

U.S. PATENT DOCUMENTS

| | | | |
|---|---|---|---|
| 5,019,815 A * | 5/1991 | Lemelson et al. | 340/933 |
| 5,936,527 A | 8/1999 | Isaacman et al. | |
| 5,982,295 A * | 11/1999 | Goto et al. | 340/10.52 |
| 6,204,764 B1 | 3/2001 | Maloney | |
| 6,707,381 B1 * | 3/2004 | Maloney | 340/568.1 |
| 6,903,656 B1 * | 6/2005 | Lee | 340/572.1 |
| 7,009,526 B2 * | 3/2006 | Hughes et al. | 340/825.49 |
| 7,164,344 B2 * | 1/2007 | Deguchi et al. | 340/10.51 |
| 7,212,116 B2 * | 5/2007 | Wang et al | 340/571 |

(Continued)

*Primary Examiner*—George A Bugg
*Assistant Examiner*—Jack Wang
(74) *Attorney, Agent, or Firm*—Young & Thompson

(57) ABSTRACT

A method of detecting and identifying an object (O) which is provided with identification elements (Io) and wireless transmission elements (Ao), the object being disposed close to one receiver module (Mi) from among a plurality of receiver modules (M1, . . . , Mi, . . . , Mn). The inventive method includes: (i) an electromagnetic coupling between the object's wireless transmission elements (Ao) and a fixed antenna (Ai) which is associated with the aforementioned receiver module (Mi); and (ii) an electrical coupling between the fixed antenna (Ai) of the receiver module (Mi) and a secondary fixed antenna (3) which is common to all of the fixed antennas (A1, Ai, . . . , An) of the receiver module. Moreover, the common secondary fixed antenna (3) is electromagnetically coupled to a primary fixed antenna (2) which is connected to a read module (4) that is designed to read the identification data originating from the identification elements (Io).

27 Claims, 5 Drawing Sheets

U.S. PATENT DOCUMENTS

| | | | |
|---|---|---|---|
| 7,387,235 B2 * | 6/2008 | Gilbert et al. | 235/375 |
| 2002/0047777 A1 * | 4/2002 | Casden | 340/10.32 |
| 2002/0057208 A1 * | 5/2002 | Lin et al. | 340/825.49 |
| 2002/0130180 A1 | 9/2002 | Stobbe | |
| 2002/0175805 A9 * | 11/2002 | Armstrong et al. | 340/10.31 |
| 2003/0033175 A1 * | 2/2003 | Ogura et al. | 705/5 |
| 2003/0189491 A1 * | 10/2003 | Ng | 340/572.9 |
| 2004/0032327 A1 * | 2/2004 | Flick | 340/568.1 |
| 2005/0043857 A1 * | 2/2005 | Van Fleet | 700/286 |
| 2005/0054293 A1 * | 3/2005 | Bann | 455/41.3 |
| 2005/0190098 A1 * | 9/2005 | Bridgelall et al. | 342/118 |
| 2006/0280149 A1 * | 12/2006 | Kuhl et al. | 370/338 |

* cited by examiner

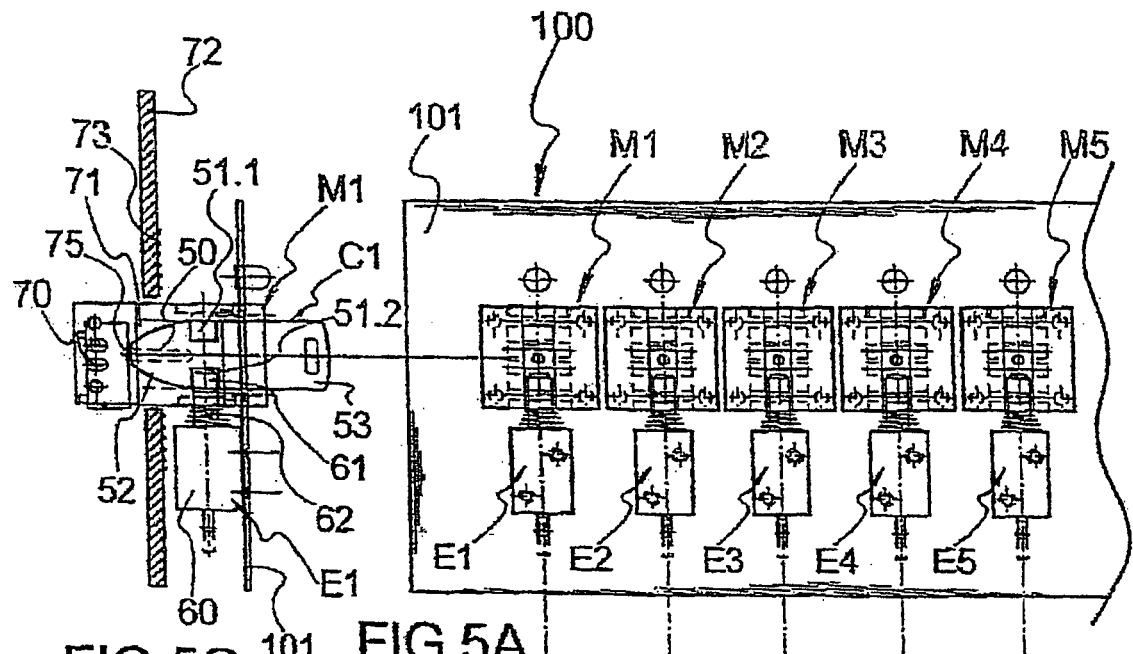
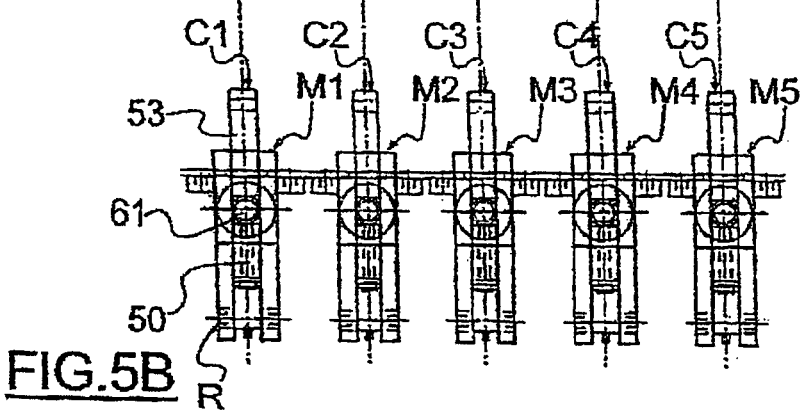
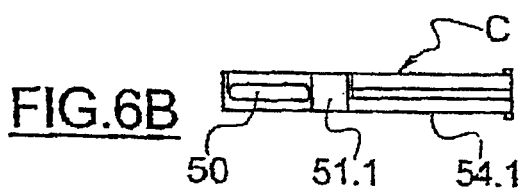
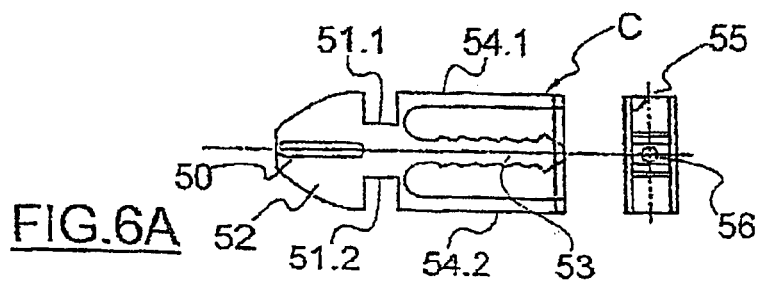

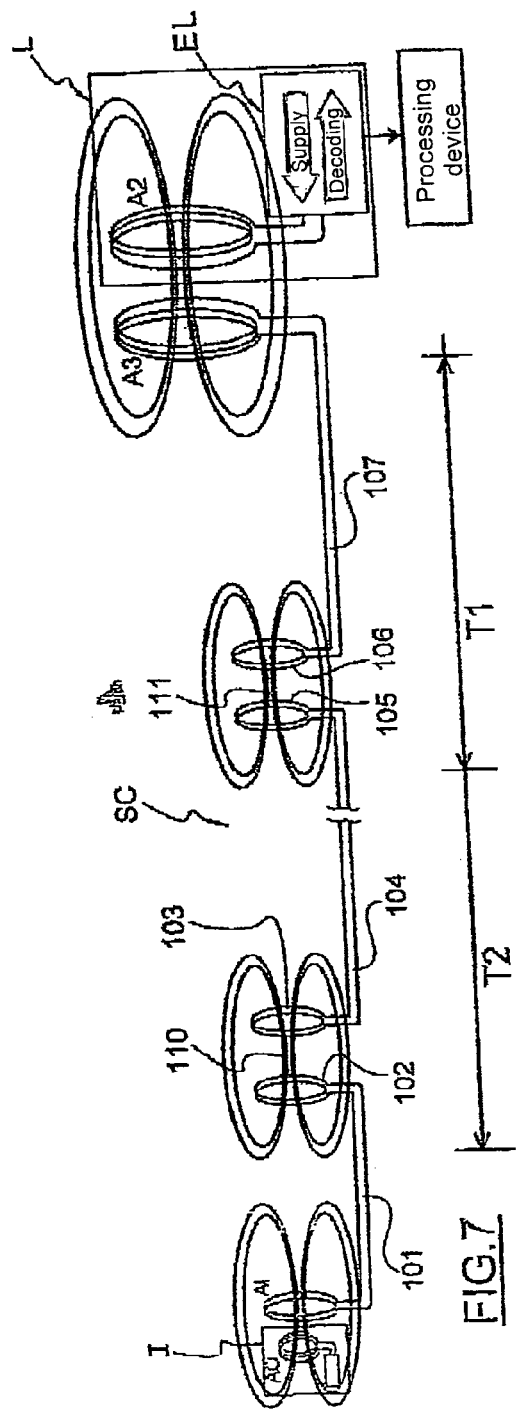
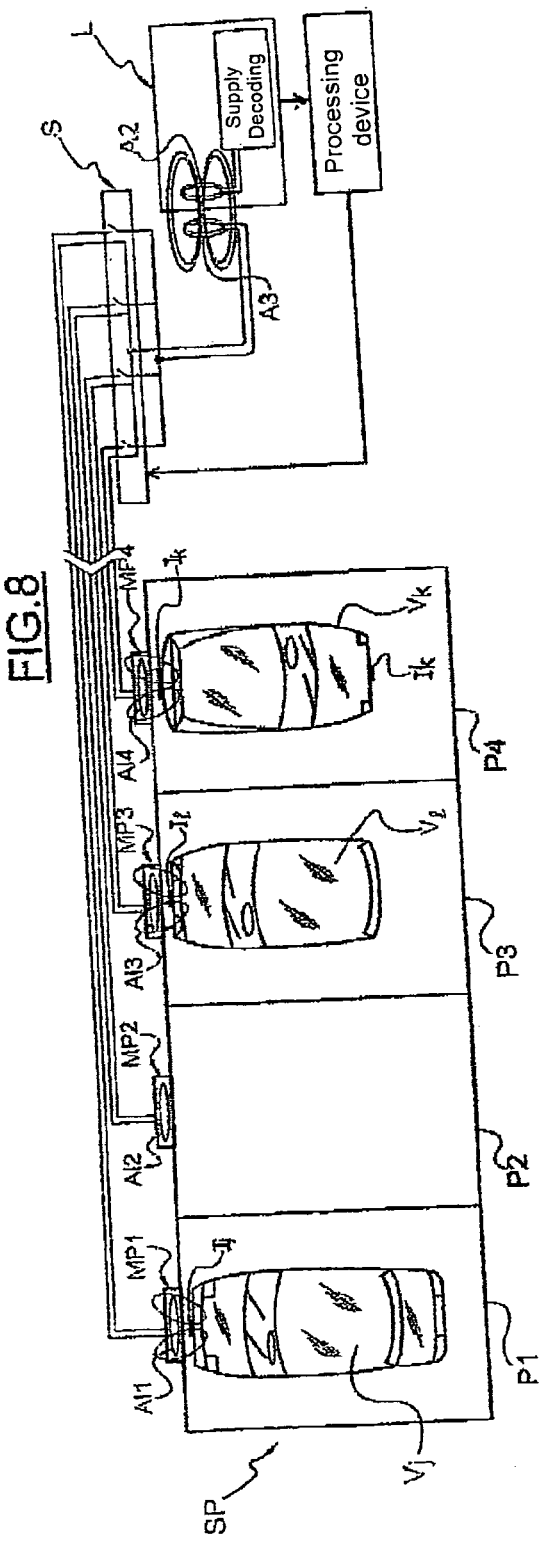

METHOD AND DEVICE FOR THE DETECTION AND IDENTIFICATION OF OBJECTS, SECURE CONTAINERS AND SYSTEMS WHICH ARE PROVIDED WITH SAID DEVICE, AND OBJECTS ADAPTED FOR SAME

BACKGROUND OF THE INVENTION

The present invention relates to a method for the detection and identification of objects. It is also aimed at a device for the detection and identification of objects using this method, objects containers and systems provided with this device, as well as objects adapted to this method.

There is a requirement for the detection and identification of objects which are of a sensitive nature in terms of security, such as keys and bunches of keys or weapons. Lockable cabinets containing modules provided for receiving keys are already known, these receiver modules being able to be equipped with locking means. Likewise, secure cabinets for storing weapons comprising devices for locking these weapons already exist.

The objects intended to be stored in these cabinets are generally provided with identification means such as electronic contact identification components of the "Dallas" type or components of the RF tag type. The locking devices associated with these objects include reader modules provided to cooperate with these identification components.

In the specific case of a lockable cupboard, providing identification and locking for each key or bunch of keys provided with identification means currently requires the provision of as many reader modules as locking modules of these keys or bunches of keys. As a result, production costs are incurred for a large capacity lockable cabinet, because of the unit cost of each reader module.

SUMMARY OF THE INVENTION

The purpose of the present invention is to propose a method for the detection and identification of a plurality of objects, which allows a significant reduction in the cost of producing secure equipment for storing such objects.

This objective is achieved with a method for the detection and identification of an object provided with identification means and wireless transmission means, this object being present close to one receiver module among a plurality of receiver modules, this method comprising:
    an electromagnetic coupling between the wireless transmission means of said object and a fixed antenna which is associated with said receiver module, and
    an electrical coupling between said fixed antenna of the receiver module and a secondary fixed antenna which is common to all of said fixed antennae of the receiver module,
this common secondary fixed antenna being electromagnetically coupled to a primary fixed antenna which is connected to a reader module which is designed to read the identification data originating from said identification means.

The detection and identification method according to the invention thus allows the production of a system requiring only one reader module designed to communicate with a plurality of objects, which helps to significantly reduce the production costs.

The secondary fixed antenna can be electrically coupled to each of the fixed antennae of each receiver module in succession.

Each electromagnetic coupling between a fixed antenna of a receiver module and wireless transmission means of an object can advantageously induces a supply, by inductive coupling, of electrical energy originating from a power supply module connected to the primary fixed antenna, to the identification means within said object.

Each electromagnetic coupling between a fixed antenna of a receiver module and wireless transmission means of an object can also allow a transmission of identification data transmitted by the identification means of said object towards the reader module.

In an advantageous embodiment of the method according to the invention, this method also comprises a processing of the identification data originating from the identification means of an object, and a selective control of blocking/locking means which are associated with the receiver module whose antenna is electromagnetically coupled to the wireless transmission means of said object.

In a particular version of the invention, the secondary fixed reading antenna is connected to the fixed reception antenna via a plurality of link sections in a cascade each comprising an electrical link between a secondary intermediate antenna of the link section and a primary intermediate antenna of this link section and an electromagnetic coupling between this primary intermediate antenna and a secondary intermediate antenna of a following link section.

According to another aspect of the invention, a device for the detection and identification of an object provided with identification means and wireless transmission means is proposed, this object being present close to one receiver module among a plurality of receiver modules, this device comprising:
    a plurality of fixed antennae each associated with one receiver module of the plurality of receiver modules,
    means for selectively connecting one antenna of said plurality of fixed antennae to a common secondary fixed antenna,
    a primary fixed antenna electromagnetically coupled to the secondary fixed antenna, and
    a common reader module designed to read the identification data originating from said identification means, this reader module being connected to the primary fixed antenna.

The selective connection means are arranged in order to connect each fixed antenna of the module to the secondary fixed antenna in sequence.

The detection and identification device according to the invention can also advantageously comprise a power supply module connected to the primary fixed antenna, this module being arranged in order to transmit electrical energy to the identification means of an object whose wireless transmission means are in an inductive coupling with a fixed antenna of a receiver module, via the electromagnetic coupling between the primary fixed antenna and the secondary antenna and the electromagnetic coupling between the fixed antenna of the receiver module and the wireless transmission means of said object.

According to yet another aspect of the invention, equipment for housing in a secure manner a plurality of objects each provided with identification means and wireless transmission means is proposed, comprising:
    a group of modules designed to each receive one object among said plurality of objects, each receiver module comprising means for selectively blocking/locking an object, and
    means for controlling said selective blocking/locking means, characterized in that it also comprises a plurality of fixed antennae each associated with one receiver module among the plurality of receiver modules, means for selectively connecting one antenna among said plurality of fixed antennae to a common secondary fixed antenna, and a primary fixed antenna electromagnetically coupled to the secondary fixed antenna, and a common reader module designed to read the identification data originating from said identification means, this reader module being connected to the primary fixed antenna and cooperating with the control means.

When the equipment is provided for the management of a set of keys, each receiver module can then comprise:

a housing arranged to receive a mechanical coupling part of a key or a key ring, this part including the wireless transmission means, a fixed antenna of the module arranged close to said housing so as to realize an electromagnetic coupling between said fixed antenna and the wireless transmission means of an object whose mechanical coupling part is engaged in the receiver housing, and an electromagnet comprising a mobile part arranged so as to engage in said mechanical coupling part.

The mechanical coupling part can have one end which comprises in an substantially cylindrical cavity the wireless transmission means and the identification means of the object.

The mechanical coupling part can for example comprise:

a first part comprising:

a head which includes the wireless transmission means and the identification means, a shielded part for receiving the mobile part of a blocking/locking electromagnet, a non-reversible mechanical coupling part, and a second part comprising at least one housing for receiving the non-reversible mechanical coupling part of the first part.

Equipment according to the invention can also be arranged to store, in a secure manner, weapons provided with identification means and wireless transmission means.

According to yet another aspect of the invention, a system for the detection and identification of a vehicle on a parking space of a parking area, using the method according to the invention, is proposed, characterized in that this parking space comprises a fixed reception antenna electrically connected to a primary antenna common to all of the parking spaces of this parking area and electromagnetically coupled to an antenna of a common reader module, this vehicle being equipped with an identifier module comprising an antenna arranged inside the vehicle in order to be electromagnetically coupled to the fixed reception antenna of this parking space when the vehicle is parked in this parking space.

The identifier module of the vehicle can be included in one and/or more of the number plates of the vehicle, and be provided in the form of a chip or radiofrequency tag (RF tag).

BRIEF DESCRIPTION OF THE DRAWINGS

Other advantages and characteristics of the invention will become apparent on examination of the detailed description of an embodiment which is in no way limitative, and the attached drawings in which:

FIGS. 5A, 5B and 5C are respectively a top view, a front view and a side view of a rack of receiver modules of equipment containing keys according to the invention, partially represented;

FIGS. 6A and 6B are respectively a side view and a top view of a key ring according to the invention;

FIG. 7 illustrates a detection and identification system according to the invention, mounted in cascade and FIG. 8 illustrates an application of the method according to the invention in order to produce a system for the detection and identification of vehicles in a group of parking spaces.

DETAILED DESCRIPTION OF THE PREFERRED EMBODIMENTS

The operating principle of the detection and identification method according to the invention will now be described, with reference to the figures mentioned above.

Figure 1:
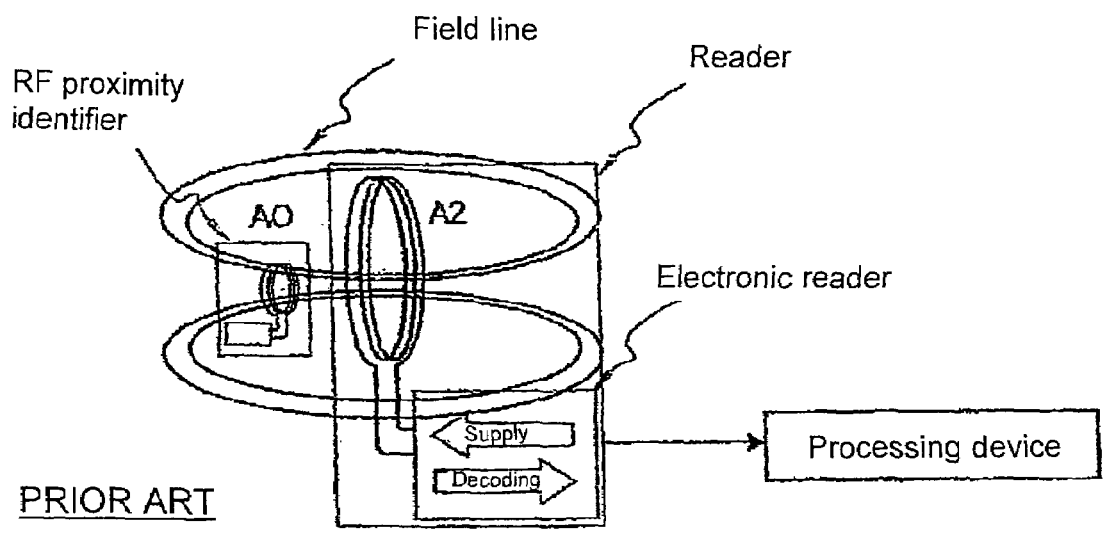
FIG. 1 diagrammatically illustrates, as the prior art, the principle of proximity radio frequency identification used in the detection and identification method according to the invention.

This method uses the well known principle of proximity radio frequency identification (RFID) illustrated by FIG. 1. According to this principle, the electronics of an identifier component are powered by the current produced by the power supply of the electronics of a reader and induced in an antenna AO by an antenna A2.

If the distance between the antenna AO and the antenna A2 is sufficiently small as to allow the induction of a sufficient current, then the electronics of the identifier transmits its radio frequency number via the antenna AO. This number is picked up by the antenna A2 then decoded by the electronics of the reader. The distances between antennae currently provided in the applications of this principle are of the order of 5 to 80 cm.

Figure 2:
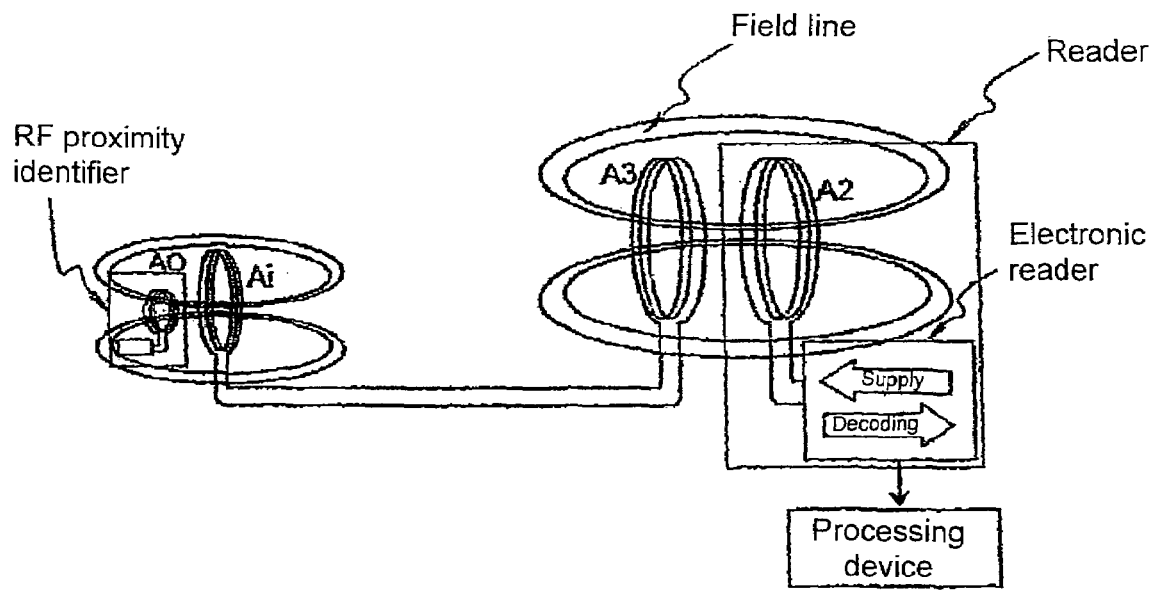
FIG. 2 diagrammatically illustrates the principle of the detection and identification method according to the invention.

In the detection and identification method according to the invention diagrammatically illustrated in FIG. 2, two antennae A3, Ai are used, electrically looped in a simple manner, which allow, without a power supply or an electronic processing device, change in the induction and data transmission phenomenon, and therefore the entire principle of proximity radio frequency identification of the prior art.

In this method according to the invention, the power supply of the electronics of a reader produces an induced current in an antenna A3. This current, reduced by line losses, takes place in the antenna coil Ai.

If the distance between the antenna AO and the antenna Ai is sufficiently small as to allow the induction of a sufficient current, the electronics of the identifier sends its radio frequency number via the antenna AO. This number is picked up by the antenna Ai, retransmitted by the cable to the antenna A3, which retransmits it to the antenna A2. This number is then picked up by the antenna A2 and decoded by the electronics of the reader.

Figure 3:
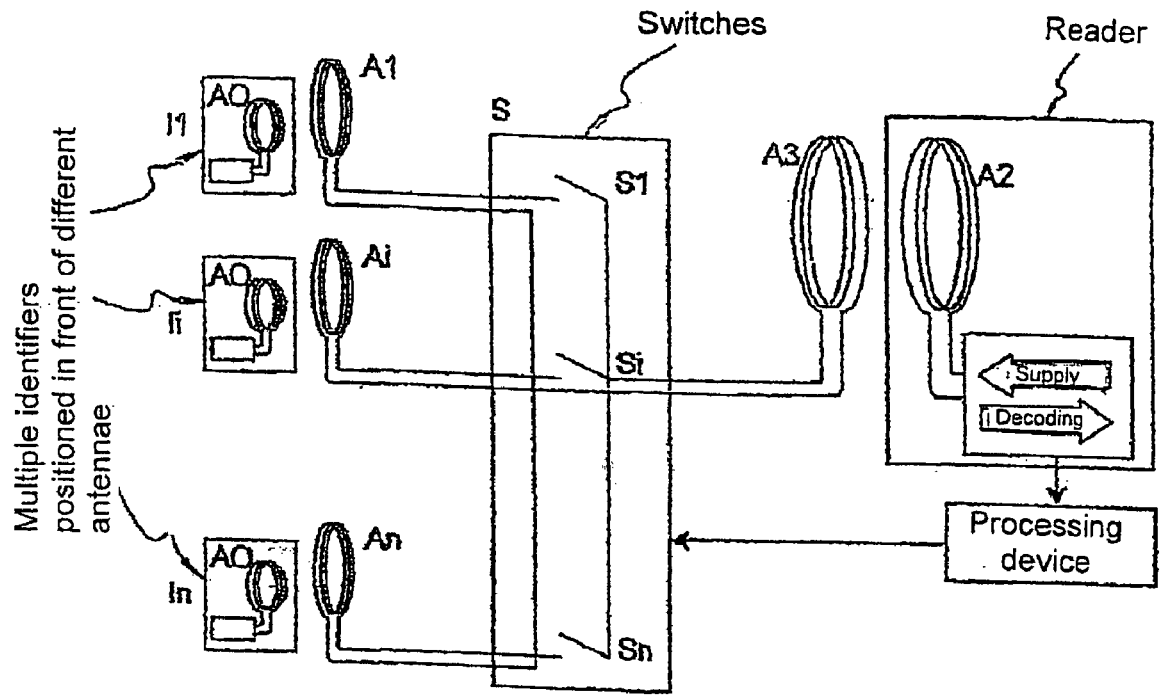
FIG. 3 diagrammatically illustrates the implementation of the detection and identification method according to the invention for a group of modules receiving objects.

The detection and identification method according to the invention can be used for a group of receiver modules, as is illustrated diagrammatically by FIG. 3. For this purpose, an analogue switch device is used which permits to realize a multiplexing of the antennae each associated with identifiers. In this configuration, multiple identifiers I1, ..., Ii, ..., In can be positioned in front of different antennae A1, ..., Ai, ..., An.

Figure 4:
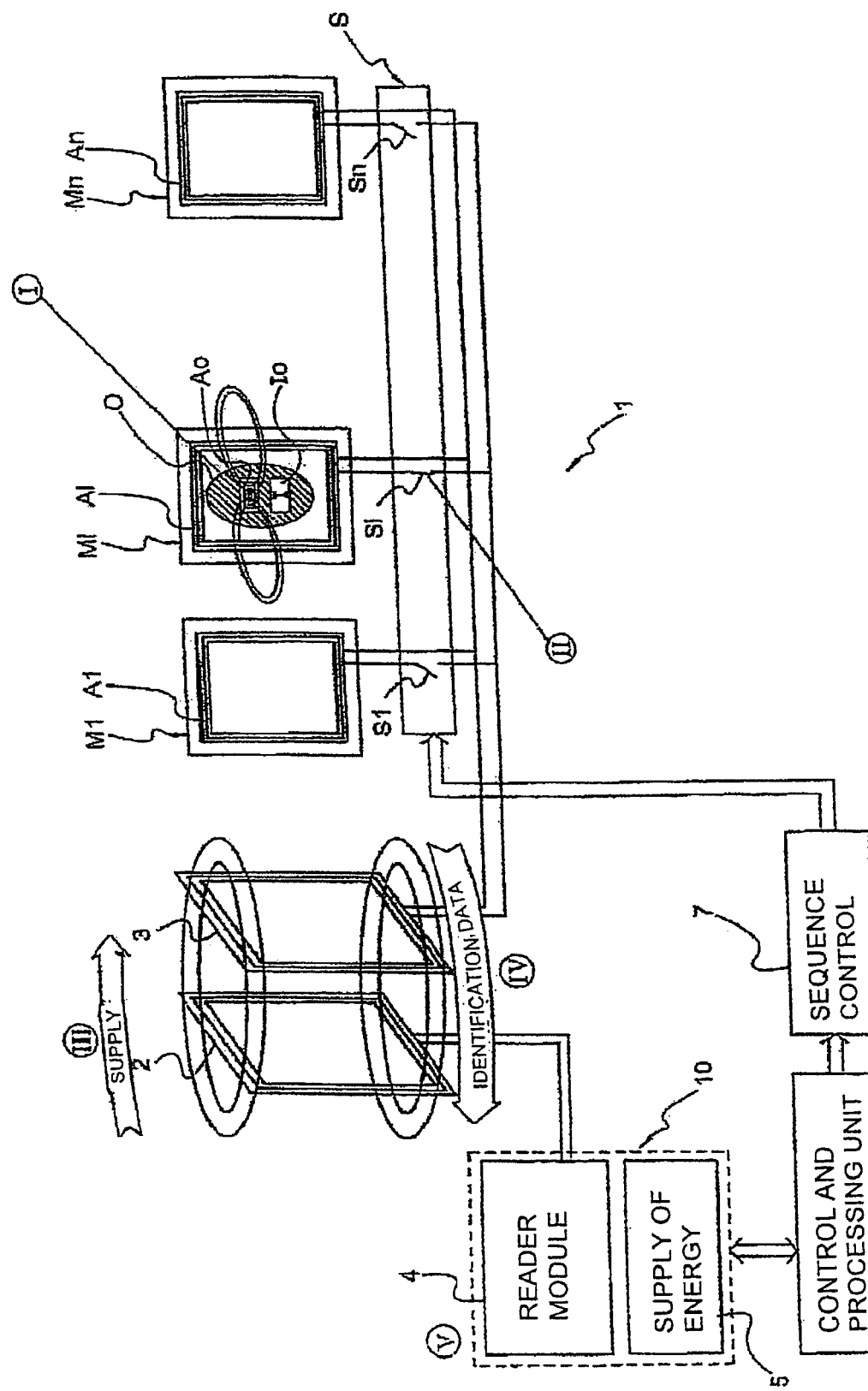
FIG. 4 illustrates the operation of the detection and identification method according to the invention when an object is detected.

Different stages of the method according to the invention will now be [described] with reference to FIG. 4 which diagrammatically illustrates a detection and identification system comprising a plurality of receiver modules.

The detection and identification device 1 comprises, with reference to FIG. 1, a group of receiver modules M1, ..., Mi, ..., Mn each provided with a receiver module antenna A1, ..., Ai, ... An, a secondary antenna 3 connected in parallel to the antennae of the receiver module A1 ..., Ai, ... An, via a group S of analogue switches S1, ..., Si, ... Sn, a primary antenna 2 in inductively coupled with the secondary antenna 3, a reading device 10 which includes a reader nodule 4 and an energy supply module 5, a control and processing unit 6 and a module 7 for sequential control of the analogue switches.

When an object O provided with an identifier circuit Io and a transmission antenna AO is situated (stage I) sufficiently close to an antenna of the module Ai so that its antenna AO is electromagnetically coupled to this antenna of the module Ai, the switching (stage II) to the closed position of the switch Si associated with this module Mi will thus allow, via the inductive coupling between the two antennae primary 2 and secondary 3 respectively and via the inductive coupling between the antenna of the module Ai and the transmission antenna AO inside the object, an energy transfer (stage III) in order to supply power to the identifier circuit I of this object.

The latter transmits back, via the same channel, identification data which are received by the antenna Ai, transmitted by induced current and retransmitted by the primary antenna 3, picked up by the primary antenna A2 (stage IV) and decoded (and read) (stage V) by the reader module 4, then processed by the control and processing unit.

The detection and identification method according to the invention can have applications for the recognition and control of access to multiple objects equipped with radio frequency (RF) identifiers and placed in a specific place, for example a lockable cabinet, a filing cabinet or a weapons locker.

It is important to note that in all the applications mentioned above, the detection and identification method according to the invention also allows information or data to be transferred to the objects identified and this information or data to be entered into memory components provided in the identification electronics of these objects.

In one embodiment example of a controlled access system with keys or bunches of keys, receiver modules M1-M5 of keys C1-C5, belonging to a group 100 of modules arranged in a linear fashion, equipped with locking devices are placed on a support plate 101, for example a printed circuit board, as illustrated by FIGS. 5A to 5D.

Each receiver module M1 comprises a housing 71 designed to receive the active part of a key C1 which includes a small glass tube 50 containing, according to techniques known in the field of RFID identification, identification electronics and a miniaturized cylindrical winding. The active part of the key C1 also comprises two recesses 51.1, 51.2 arranged so as to receive the mobile shaft 61 of a locking electromagnet E1 the fixed part 60 of which is attached to the support plate 101. This electromagnet E1 is also provided with a spring 62 which by default holds the mobile shaft 61 in the locking position of a key inserted into the receiver module M1.

When a key C1 is effectively inserted into a receiver module M1, its identification electronics 50 are electromagnetically coupled to a receiver antenna 73 arranged on a support plate 72 and electrically connected to an antennae switching device S of the type diagrammatically represented in FIG. 4.

The receiver antenna 73 can for example be produced in the form of a printed circuit on a board made of epoxy resin or any other material supporting printed circuits.

The receiver module M1 also comprises, at the bottom of the receiver housing 71, a contactor component 70 provided with a mobile contact stud 75 arranged so that when a key C1 is inserted into the receiver housing 71, the end 52 of the key C1 pushes the contact stud 75, which allows, by means of an electrical circuit (not represented) which includes the contactor 70, detection of the insertion of a key into this receiver module M1. This information on the insertion is for example processed in order to selectively supply the electromagnet corresponding to this receiver module, thus helping to significantly reduce the electrical energy consumed, compared to another technical solution which consists of supplying power to all of the electromagnets of a complete system.

Figure 5D:
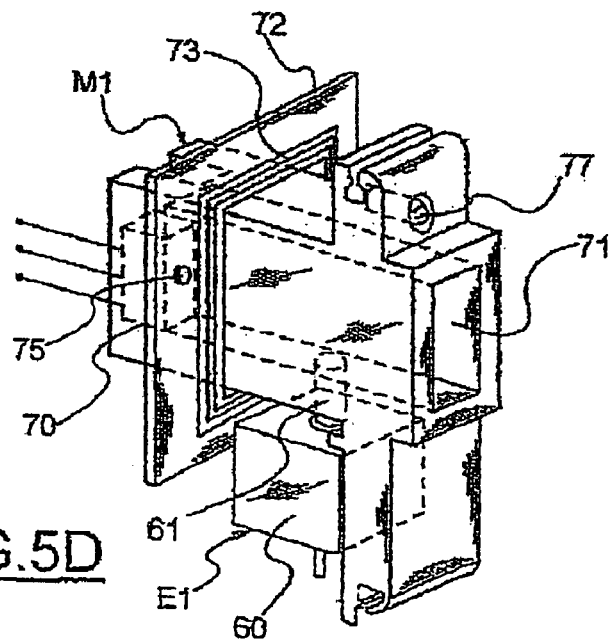
FIG. 5D is a simplified perspective view of a receiver module corresponding to the rack of receiver modules represented in FIGS. 5A to 5C.

The receiver modules M1 also comprise, with reference to FIG. 5D, cylindrical frontal housings provided in order to contain light emitting diodes (LED) 77 whose selective power supply provides the user of the system with an indication of the receiver module or modules and the respective container or containers which this user is authorized to access.

It should be noted that the reception antenna of the receiver module can have many other shapes and geometries than those of the antenna represented in FIGS. 5C and 5D. It can for example be produced in the form of a solenoid with a fine conducting wire wound around a template having any section whatever, for example circular or square. A reception antenna of the solenoid type can also be envisaged wound around a complete cylinder made of soft ferromagnetic material in order to increase the axial detection range.

More generally, a large variety of possible geometries exist for pairs of antennae used in RFID technology. It is sufficient to produce an adaptation of the geometries and number of respective coils of the two antennae which are to be electromagnetically coupled.

In a particular embodiment of a key ring which can be used in a lockable cabinet or a key shelf according to the invention, illustrated by FIGS. 6A and 6B, the key ring C comprises at the end of its active part a part 52 with a pseudo elliptical shape allowing the shaft 61 of the electromagnet E1 to be raised during the insertion of the active part of the key ring C into the housing of the receiver module M1. The cavity provided in the active part of the key ring C is designed to receive a small glass tube with a diameter of 2.12 mm and a length of 12 mm containing an electronic component.

The key ring C comprises two recesses 51.1, 51.2 designed for receiving in the locking position a mobile shaft of a locking electromagnet and two lateral parts 54.1, 54.2 extending parallel from the active part of the key ring and a toothed central part 53 of the key ring also extending from the active part of the key ring and designed to be engaged in a non-reversible manner in a housing 56 arranged in a closing part 55 when keys have previously been placed in the key ring C.

It is possible to produce an identification and detection system according to the invention by cascading several electromagnetic coupling/electrical link sections, as illustrated in FIG. 7.

Thus, a detection and identification system in cascade SC can comprise, between on the one hand a fixed antenna Ai of the receiver module designed to be electromagnetically coupled to the antenna Ao of an object provided with an identifier circuit I and on the other hand a secondary fixed antenna A3 permanently electromagnetically coupled to an antenna A2 of a reader module L which includes reading electronics EL carrying out power supply and decoding functions:

a first electrical link 101 between the antenna Ai of the receiver module and a first secondary antenna 102 electromagnetically coupled 110 to a first primary intermediate antenna 103, a second electrical link 104 between the first primary intermediate antenna 103 and a second secondary intermediate antenna 105 electromagnetically coupled 111 to a second primary intermediate antenna 106, and a second electrical link 107 between the second primary intermediate antenna 106 and the secondary fixed antenna A3.

The link between the secondary fixed antenna A3 associated with the reader module and the antenna Ai of the receiver module is thus ensured by a cascade of two link sections T1, T2 each comprising an electrical link between two antennae of a section and an electromagnetic coupling between a primary intermediate antenna of this section and a secondary intermediate antenna of the following section.

This detection and identification system in cascade SC can of course include a switching system S of the type represented in FIG. 3 in order to allow the processing of a group of receiver modules each equipped with a reception antenna.

The detection and identification method can also be used in a system for the detection and identification of vehicles in parking spaces, as illustrated diagrammatically in FIG. 8.

A system for the detection and identification of vehicles SP can thus comprise, in close proximity to each space of a group of parking spaces P1, P2, P3, P4, receiver modules MP1, MP2, MP3, MP4 each provided with a reception antenna Ai1, Ai2, Ai3, Ai4 electrically connected, via a switching system S, to a common secondary antenna A3 permanently electromagnetically coupled to an antenna A2 of a reader module L carrying out power supply and decoding functions and delivering detection and identification data to a processing device designed in particular to control the switching device S.

When vehicles Vj, Vk, Vl, each provided with identifier devices Ij, Ik, Il which each include an identification antenna, are parked in a parking space P1, P4, P3, their respective identification antennae are electromagnetically coupled to the respective reception antennae Ai1, Ai4, Ai3 of said spaces, which induces a power supply of the identifier devices Ij, Ik, Il and, in return, a transfer of identification information from the identifier devices to the common reader module L.

These identifier devices can be produced for example in the form of RFID tags integrated or inserted into the number plates of the vehicles or in any other appropriate part of the vehicle in order to allow an electromagnetic coupling with a reception antenna associated with a parking space. It can also be envisaged that a vehicle Vk is equipped with two identifiers devices Ik, Ik' integrated in the front and rear number plates of this vehicle.

In another embodiment of a vehicle detection and identification system, it can be envisaged that the reception antennae associated with each parking space are induction loops buried in the surfacing of these parking spaces, each vehicle concerned being provided with an identifier device of the RFID type fixed to its chassis or arranged in a appropriate place in the vehicle.

Of course, the invention is not limited to the examples which have just been described and numerous variations can be applied to these examples without exceeding the scope of the invention.

The invention claimed is:

1. A method for the detection and identification of an object provided with identification means and wireless transmission means, the object being located close to one receiver module among a plurality of receiver modules, the method comprising the steps of:

electromagnetically coupling the wireless transmission means of the object with a first of a plurality of fixed antennae each associated with a receiver module among said plurality of receiver modules; and switching, in an analogue manner, between each of the fixed antennae and a secondary fixed antenna common to all of the fixed antennae such that the common secondary fixed antenna is electrically connected to each of the fixed antennae of each receiver module in succession, wherein the common secondary fixed antenna is electromagnetically coupled to a primary fixed antenna connected to a reader module configured to read identification data originating from the identification means.

2. The method according to claim 1, further comprising the step of:

transmitting information from the reader module to the identification means of a previously detected and identified object.

3. The method according to claim 1, wherein each electromagnetic coupling induces a supply of electrical energy to the identification means of the object by inductive coupling, the electrical energy originating from a power supply module connected to the primary fixed antenna.

4. The method according to claim 3, wherein each electromagnetic coupling induces a transmission of identification data transmitted by the identification means of the object towards the reader module.

5. The method according to claim 1, further comprising the steps of:

processing the identification data originating from the identification means of an object; and selectively controlling a blocking/locking means associated with the receiver module when the antenna of the receiver module is electromagnetically coupled to the wireless transmission means of the object.

6. The method according to claim 1, wherein the electromagnetic coupling between the secondary fixed antenna and the primary fixed antenna of the reader module is permanent, and wherein the secondary fixed antenna is connected to the primary fixed antenna via a plurality of link sections in cascade, each link section comprising an electrical link between a secondary intermediate antenna of the link section and a primary intermediate antenna of the link section and an electromagnetic coupling between the primary intermediate antenna and a secondary intermediate antenna of a following link section.

7. A device for the detection and identification of an object provided with identification means and wireless transmission means, the object being present close to one receiver module among a plurality of receiver modules, the device comprising:

a plurality of fixed antennae each associated with one receiver module among the plurality of receiver modules;

analogue switching means for selectively electrically connecting one antenna among the plurality of fixed antennae to a common secondary fixed antenna;

a primary fixed antenna electromagnetically coupled to a secondary fixed antenna; and a common reader module configured to read identification data originating from the identification means, the reader module being connected to the primary fixed antenna.

8. The device according to claim 7, wherein the common reader module is further configured to transmit information to an object close to a receiver module.

9. The device according to claim 7, wherein the selective connection means is configured to connect each fixed antenna of the module to the secondary fixed antenna in a sequence.

10. The device according to claim 7, further comprising:
a power supply module connected to the primary fixed antenna, the power supply module configured to transmit electrical energy to the identification means of the object, the wireless transmission means the object being inductively coupled to a fixed antenna of a receiver module via the electromagnetic coupling between the primary fixed antenna and the secondary antenna and the electromagnetic coupling between the fixed antenna of the receiver module and the wireless transmission means.

11. The device according to claim 9, wherein the common secondary antenna is electromagnetically coupled to a primary intermediate antenna, the primary intermediate antenna being electrically connected to a secondary intermediate antenna electromagnetically coupled to the primary fixed antenna of the reader module.

12. The device according to claim 11, further comprising:
a plurality of pairs of intermediate antennae each constituted by a primary intermediate antenna and a secondary intermediate antenna which are electrically connected.

13. Equipment for securely storing a plurality of objects each provided with identification means and wireless transmission means, comprising:
a group of modules each configured to receive one object among the plurality of objects, each receiver module comprising means for selectively blocking/locking an object;
means for controlling the selective blocking/locking means;
a plurality of fixed antennae each associated with one receiver module among the plurality of receiver modules;
means for selectively electrically connecting one antenna among the plurality of fixed antennae to a common secondary fixed antenna;
a primary fixed antenna electromagnetically coupled to the secondary fixed antenna; and
a common reader module configured to read identification data originating from the identification means, the reader module being connected to the primary fixed antenna and cooperating with the control means.

14. The equipment according to claim 13, further comprising:
electrical supplying means connected to the primary fixed antenna configured to supply power to the identification means of the object, the wireless transmission means the object being inductively coupled to one antenna of one of the receiver modules of the equipment.

15. The equipment according to claim 13, wherein each receiver module comprises:
a housing arranged to receive a mechanical coupling part of a key or a key ring, the coupling part including the wireless transmission means,
a fixed antenna of the module arranged close to the housing to produce an electromagnetic coupling between the fixed antenna and the wireless transmission means of the object, the mechanical coupling part of the object being engaged in the receiver housing, and
an electromagnet comprising a mobile part configured to engage in the mechanical coupling part.

16. The equipment according to claim 15, wherein the mechanical coupling part has one end comprised of a substantially cylindrical cavity, the wireless transmission means of the object, and the identification means of the object.

17. The equipment according to claim 15, wherein the mechanical coupling part is comprised of a first part with a head including the wireless transmission means and the identification means, an indented part for receiving the mobile part of a blocking/locking electromagnet, a nonreversible mechanical coupling part, and a second part with at least one housing for receiving the non-reversible mechanical coupling part of the first part.

18. The equipment according to claim 13, wherein the group of modules is configured to store in a secure manner weapons provided with identification means and wireless transmission means.

19. The method according to claim 1, wherein the object is comprised of an identification means and wireless transmission means configured to exchange information by proximity radiofrequency with the receiver module.

20. The method according to claim 19, wherein a means for mechanical coupling with selective blocking/locking means is arranged in the receiver module.

21. The method according to claim 1, wherein the wireless transmission means is configured for the management of keys or bunches of keys in a lockable cabinet.

22. The method according to claim 1, wherein the wireless transmission means is configured for the management of documents in a filing cabinet.

23. The method according to claim 1, wherein the wireless transmission means is configured for the management of weapons in a weapons locker.

24. The method according to claim 1, wherein the wireless transmission means is configured for the identification of a vehicle in a parking space.

25. The method according to claim 1, wherein the fixed reception antenna is associated with a parking space, and is electrically connected to the primary antenna configured to be common to all of parking spaces of a parking area and electromagnetically coupled to an antenna of a common reader module, and the identification means and the wireless transmission means are arranged as an identifier module in a vehicle in order to be electromagnetically coupled to the fixed reception antenna of the parking space when the vehicle is parked in the parking space.

26. The method according to claim 25, wherein the identifier module of the vehicle is included in one and/or more of the number plates of the vehicle.

27. The method according to claim 26, wherein the identifier module of the vehicle is provided in the form of a radiofrequency tag (RF tag).

* * * * *